(12) United States Patent
Fazel et al.

(10) Patent No.: US 6,237,116 B1
(45) Date of Patent: May 22, 2001

(54) TESTING ERROR CORRECTING CODE FEATURE IN COMPUTERS THAT DO NOT HAVE DIRECT HARDWARE FEATURES FOR CAUSING SINGLE BIT AND MULTI-BIT ERRORS

(75) Inventors: Magid Fazel, Vestal; Linda A. Porter, Newark Valley, both of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/192,310

(22) Filed: Nov. 16, 1998

(51) Int. Cl.$^7$ .................................................. G11C 29/00
(52) U.S. Cl. ........................................ 714/720; 714/758
(58) Field of Search ................................... 714/720, 719, 714/803, 758; 364/200

(56) References Cited

U.S. PATENT DOCUMENTS

| | | | |
|---|---|---|---|
| 4,223,382 | * 9/1980 | Thorsrud | 364/200 |
| 4,561,095 | 12/1985 | Khan | 371/38 |
| 4,794,597 | 12/1988 | Ooba et al. | 371/3 |
| 4,878,220 | 10/1989 | Hashimoto | 371/40.1 |
| 5,228,046 | 7/1993 | Blake et al. | 371/39.1 |
| 5,379,304 | * 1/1995 | Dell et al. | 714/763 |
| 5,446,873 | 8/1995 | Chan | 395/180 |
| 5,502,732 | * 3/1996 | Arroyo et al. | 714/746 |
| 5,535,226 | 7/1996 | Drake et al. | 371/40.1 |
| 5,555,250 | * 9/1996 | Walker et al. | 714/763 |
| 5,623,506 | * 4/1997 | Dell et al. | 714/763 |

* cited by examiner

Primary Examiner—Albert Decady
Assistant Examiner—David Ton
(74) Attorney, Agent, or Firm—McGuireWoods LLP

(57) ABSTRACT

Built-in tests included in reset functions of single board computers can be rapidly performed to confirm adequate functionality without additional hardware support by disabling an error correcting code function in a memory controller, writing a pattern of predictable parity to a location in memory and reading and correcting the pattern with the error correcting code function of the memory controller re-enabled. Thus, resets caused by, for example, momentary soft errors or power interruptions can be executed within rigid time constraints and thus negligibly short interruptions of processor function.

14 Claims, 3 Drawing Sheets

TESTING ERROR CORRECTING CODE FEATURE IN COMPUTERS THAT DO NOT HAVE DIRECT HARDWARE FEATURES FOR CAUSING SINGLE BIT AND MULTI-BIT ERRORS

BACKGROUND OF THE INVENTION

1. Field of the Invention

The present invention generally relates to the testing of data processors having memory and, more particularly, to the execution of built-in tests (BIT) of memory in single board computers.

2. Description of the Prior Art

Many systems are currently in use which require the inclusion of many data processors to provide the complex control functions which may be required. Avionics is exemplary of fields in which such complex control systems are often required to gather information about the aircraft condition, attitude (e.g. roll, pitch, yaw) and environment (e.g. altitude, temperature) and to control flight surfaces and other aircraft mechanisms to achieve the operations that the pilot may desire.

In such applications, the data processors are generally provided in the form of single board computers (SBCs) which can be conveniently mounted and interconnected. Particularly popular SBCs in widespread use at the present time utilize PowerPC chips which support parity generation and checking on the data bus and Motorola MPC106 Memory controllers which support error correction codes (ECC) but does not include hardware support for forcing errors into memory for testing the ECC logic.

Such single board computers commonly include a large amount of memory which is built using very dense memory parts. High density memory parts are prone to produce single bit errors in data or instruction codes stored therein (e.g. due to impingement of alpha particles causing discharge of stored charge, particularly in high altitude applications). Single bit errors can be corrected using error correcting codes (ECC) rather than standard parity checking which is commonly provided in the processor. It is common at the present time to provide some form of error correcting code feature having at least the capability of correcting single bit errors and detecting (but not correcting) two-bit or multiple bit errors in memory controller integrated circuit chips.

It is common practice to provide for reset of a computer when power is applied to it in order to at least determine that the processor and memory are functional prior to attempting to process data therewith. As part of the "power up reset" operation, the single board computers are required to run a minimum set of built-in tests (BITs), one of which verifies that memory is operational and accessible by the processor. A reset operation which includes a similar minimum set of BITs including memory testing may also be provided when errors are detected in the course of memory accesses or in processing.

There are two basic approaches to performing a built-in test of memory: the pattern test method and the force error method. However, each of these approaches, while effective, has some characteristic drawbacks. The pattern test method is extremely time consuming since it requires the writing of a pattern into each memory location from which the pattern is read back. The force error method requires additional hardware that can force specific error correcting code patterns into memory. Such additional hardware is not generally provided in memory controllers, as indicated above, and must, at the present state of the art, be separately provided by additional hardware logic circuits and connections in the computer. In single board computers, board space (and often weight and power consumption specifications) is at such a premium that separate provision of hardware support for force error testing is impractical and possibly prohibitive in some applications. U.S. Pat. No. 5,502,732, to Arroyo et al. is exemplary of systems in which hardware support is required for ECC logic testing.

However, in systems in which SBCs are often employed, such as for providing real time control, the time required for the alternative pattern test method of memory testing is generally not acceptable. For example, upon a momentary power interruption in an aircraft, control by the SBC would not be available while the pattern test was being carried out and could precipitate a malfunction or the development of conditions from which recovery might not be possible. Many applications will also have power up time specifications which cannot be met if the pattern test method is employed to verify memory function.

SUMMARY OF THE INVENTION

It is therefore an object of the present invention to provide a memory test of the force error type which does not require hardware support.

It is another object of the invention to provide an effective memory test and/or a reset operation including a memory test for a single board computer which can be rapidly executed.

In order to accomplish these and other objects of the invention, a control arrangement is provided to use the processor to write patterns of predictable parity into memory while the error correcting code feature of the memory controller is disabled and then to read the same pattern from the same location in memory with the error correcting code feature of the memory controller enabled to thus compare the predictable or forced parity bits with the error correcting code for the same pattern of bits. Parity generation may be disabled to force a known pattern of parity bits to be written or enabled on respective iterations or repetitions of the writing operation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
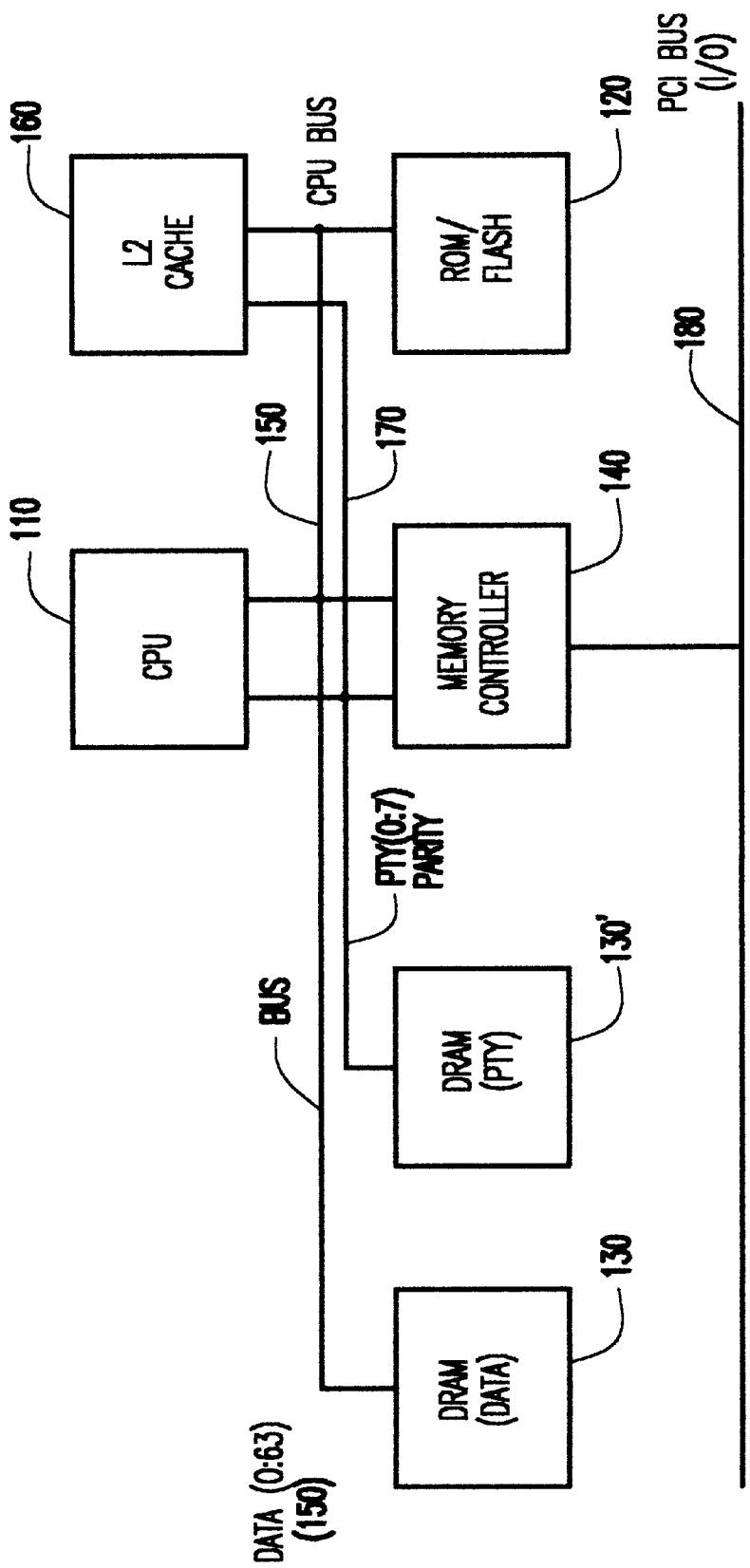
FIG. 1 is a high-level schematic diagram of a portion of a single board computer relevant to the understanding of the invention.

Referring now to the drawings, and more particularly to FIG. 1, there is shown a high-level block diagram of a portion of a single board computer (SBC) 100 including the processor 110 and associated read-only memory (ROM) 120, preferably implemented in a flash electrically erasable programmable read-only memory (EEPROM), random access memory (RAM) 130, memory controller 140, data bus 150 and cache 160. System or data bus 150, including a "parity" data bus 170, connect the CPU 110, DRAM 130, 130', memory controller 140 and L2 Cache 160. Control connections are omitted in the interest of clarity but will be evident to those skilled in the art. ROM 120 is also connected to bus 150 for communication with the CPU. Additionally, I/O bus 180 is shown connected to the memory controller but this connection and the inclusion of an I/O bus are not important to the practice of the invention or the basic principles thereof.

It should be understood that the invention seeks to avoid a need for hardware support for a force error testing method and the arrangement of FIG. 1 thus also represents SBCs which do not include the invention. That is, FIG. 1 schematically includes the hardware connections of current SBC designs over which signals are communicated in accordance with implementation of the invention by novel instruction and data signals stored in ROM/flash EEPROM 120, particularly preferred data patterns of predictable parity. Accordingly, no portion of FIG. 1 is admitted to constitute prior art in regard to the present invention.

It should also be understood that parity checking commonly provided in processors currently available (and in regard to which the preferred embodiment of the invention will be described) provides for multi-byte (e.g. 64 bit) word reads from and writes to memory (as well as other formats) while providing odd parity for each eight bits of the word. (The invention would similarly be applicable to processors providing even parity using data patterns different from those discussed below in regard to the currently preferred form of the invention.) Storage of a 64-bit words is accomplished by executing a STFD (store floating point double) instruction in the processor which also generates an eight-bit parity byte.

That is, for the type of SBC including a CPU and memory controller of the respective types alluded to above, a parity bit will be set to "1" if there are an even number of "1's" in a corresponding eight-bit byte in the 64-bit word, yielding an eight bit parity byte stored in DRAM 130' for each sixty-four bit word. However, many other parity checking arrangements are known and well-understood in the art and application of the invention thereto will be apparent to those skilled in the art from the following description of the invention.

Figure 2:
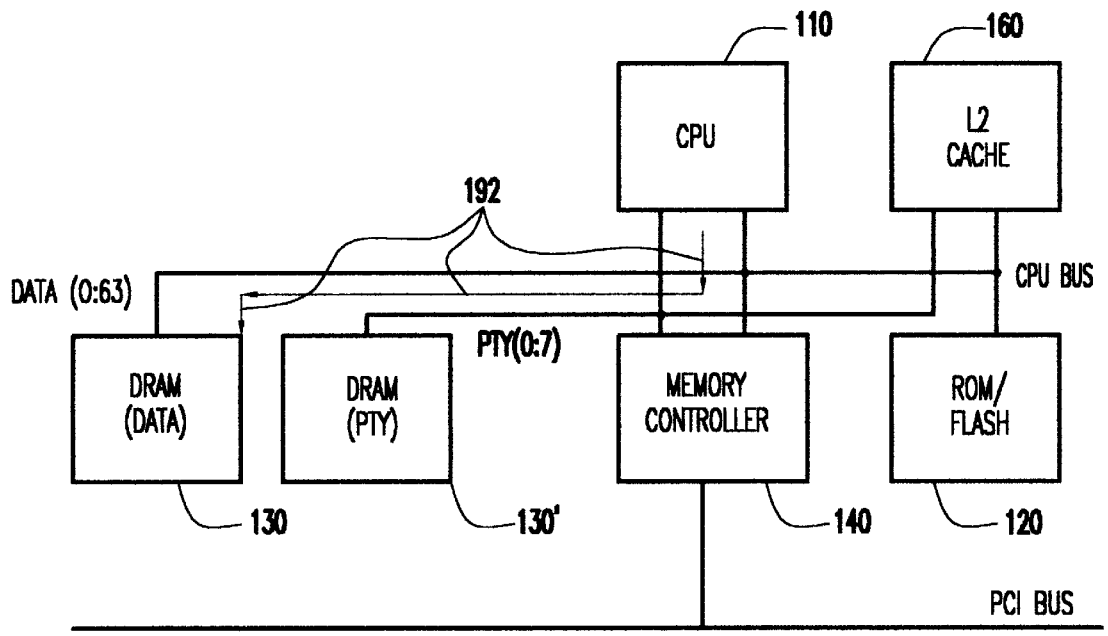
FIG. 2 is a replication of FIG. 1 including illustration of data writing and reading with parity checking.

More specifically, ROM 120 contains instructions and data for operation, including testing during reset operations, of processor 110 together with memory 130, cache 160 and memory controller 140 as well as communications over data bus 150. These instructions are provided to the CPU over bus 150 in a manner well-understood in the art to support CPU control of the remainder of the elements of the SBC. As shown in FIG. 2, the normal writes to and reads from memory, whether during testing or normal operation, are performed directly to DRAM 130, 130'. This operation is synchronized (e.g. including address translation and the like) by memory controller 140 but memory controller 140 does not otherwise take part in the operation or involve the data to be written or read.

During a write operation, illustrated by arrows 192 the CPU generates a parity byte as discussed above for each sixty-four bit word and supplies both the sixty-four bit word and the parity byte to DRAM portions 130, 130', respectively, to be stored therein. (Articulation of the memory to accommodate such a storage format is not important to the invention and the segmentation of DRAM into portions 130 and 130' is only illustrated for purposes of clarity in explaining operation of the invention.) A corresponding read operation can be visualized by reversing all of arrows 192. Again, memory controller 140 synchronizes the read operation but is not involved with the data or parity byte read.

It should be understood that the type of write and read operations illustrated in FIG. 2 are generally preferred since direct writing and reading can be performed very quickly in a very few CPU cycles. Error detection can be accomplished on the basis of the parity bits even though error correction, available in memory controller 140, cannot. This preference is a practical consideration since the development of error correction codes and provision for correction increase signal propagation time and slow operations although errors may occur only rarely. Nevertheless, when an error occurs, it is necessary to halt and re-start (e.g. reset) the CPU with the attendant loss of data, execution of built-in testing and unavailabity of processing function while such testing is done and data is re-acquired.

Figure 3:
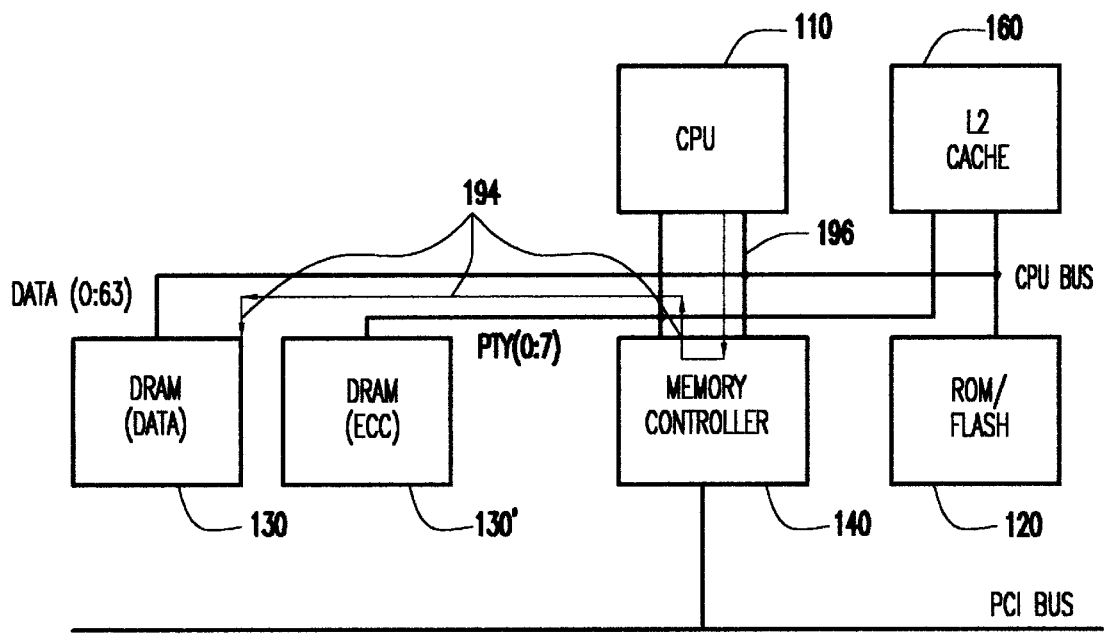
FIG. 3 is a replication of FIG. 1 including illustration of data writing and reading using error correction codes.

More specifically, writing and reading operations utilizing error correction codes (ECC) are illustrated in FIG. 3 with the data path for a write operation indicated by arrows 194, 196. A read operation would follow the same path but in an opposite direction.

As before, for a write operation, the CPU 110 supplies the data word together with a generated corresponding parity byte. The data and parity byte are received by memory controller 140 over bus 150, 170 where the memory controller generates an ECC corresponding to the data which is substituted for the parity byte. The data word and the ECC are then provided to DRAM 130, 130' for storage in accordance with control signals provided by the memory controller 140. As will be evident to those skilled in the art, separate bus cycles must be used to accommodate the change of the parity byte to an ECC for storage in DRAM 130' which increases the time required for a write operation. The time required for a write operation is also increased by the time required for generation of the ECC by propagation of the data word through ECC logic in the memory controller 140.

A read operation follows the same path but in the opposite direction. The data word and the corresponding ECC are evaluated in the memory controller 140 and single bit errors are corrected (while errors of two or more bits are reported). The memory controller 140 then develops a parity byte corresponding to the data (or corrected data) and provides the data and parity byte to CPU 110. Again, separate bus cycles and time for propagation of signal through error correcting logic and generation of a parity byte are required.

It should be understood that currently available SBCs can conduct read or write operations in either of the modes illustrated in FIG. 2 (using parity only) or FIG. 3 (using ECC only with incidental generation of parity bytes). However, the read/write mode used must remain consistent because there is no resource available for determining whether signals returned from DRAM 130' represent parity or ECCs if ECCs and parity bytes were to be concurrently stored. By the same token, unless an ECC is generated for a data word when it is transmitted for storage by the CPU 110, no error correction is possible. Therefore, the operation of the SBC must be limited to one or the other of such modes of DRAM access.

The invention, however, exploits the availability of these two modes of DRAM access to achieve the above-noted objects of the invention without a requirement for additional hardware support. Specifically, to provide a force error type of memory test executable in a very short time without additional hardware support, the invention provides for writing of a very specific pattern into a location in DRAM 130, 130' in accordance with the memory access mode of FIG. 2 (but preferably with the parity byte generation disabled in order to output "00000000" parity signal for any data word) and reading that location in DRAM in accordance with the memory access mode of FIG. 3.

In this regard, the data patterns for determining single bit and two bit errors must be carefully chosen to provide the meritorious effect of the invention and, while the patterns discussed below are preferred for practice of the invention and allow optimal simplicity, it is possible that other suitable patterns exist. The critical feature of these patterns is that the states of respective bits of the parity byte should differ from the expected error correction code by a specific number of bits and the specific number of bits of at least one iteration of the test should be one bit to simulate a (correctable) single bit error.

Figure 4:
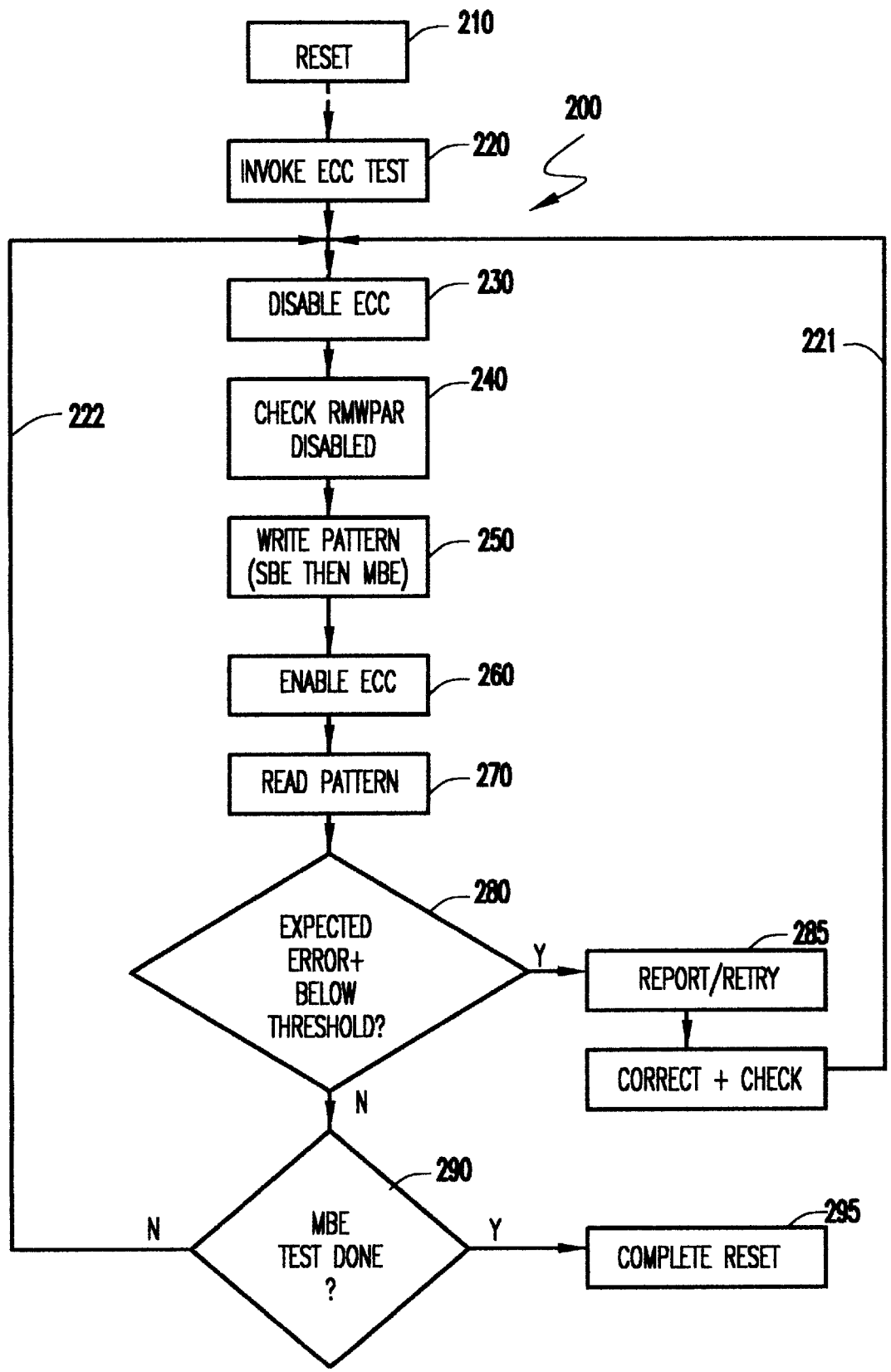
FIG. 4 is a flow diagram illustrating operation of the invention.

Referring now to FIG. 4, the operation and methodology 200 of the invention will now be explained. The invention primarily takes advantage of writing a pattern of predictable parity instead of an ECC while the ECC feature of the memory controller 140 is disabled (e.g. by applying a logic "0" to bit 17 of register address F4 of a Motorola MPC106 memory controller). To a lesser extent, the invention preferably also takes advantage of the fact that multi-bit errors involving more than two bits are extremely rare to the point that they can be neglected, if desired, for rapid execution of the test in accordance with the invention.

Data patterns having predictable parity, such as the exemplary patterns which will be discussed below, can be readily calculated. It is only important to the practice of the invention that the parity of the pattern, as generated by the CPU 110, be inconsistent with the expected ECC for the same data word in accordance with the ECC logic of the memory controller 140 to which the invention is applied. In the following description, the parity checking arrangement described above (for even parity) is assumed (or disabled to provide a "00000000" parity byte) and the test pattern is chosen to produce odd parity and, preferably, a difference of states of only a small number of bits (including one bit) from the expected ECC for the same data.

As will be understood by those skilled in the art in view of this description of the invention, the environment in which the process of FIG. 4 is carried out must be closely controlled. However, such a controlled environment can be readily achieved during a testing or reset operation in the processor. Specifically, the ECC test code (BIT) must be executing from the ROM 120, there must be no other activity on the data bus 150 of the CPU (e.g. no peripheral component interconnect processes to be placed on bus 180 and no L2 cache (e.g. a cache external to the processor) activity. This portion of the environment is typical during start-up operations. There should also be no accesses to RAM which are other than a particular word width (e.g. 64-bits). This latter condition can be readily accomplished by the STFD instruction alluded to above.

Consider the preferred word pattern "FFFEFEFEFEFEFEFE" (hex) in which each pair of digits is represented by an eight bit byte. If the parity generation function of CPU 110 is disabled (e.g. by setting, for example, to logic "1", bit 1 of the Hardware Implementation-Dependent register 0 (HID0) on a PowerPC 740/750 chip), the parity bus will be driven to "00000000" (binary). In comparison, the ECC code which would be expected for this particular data word would be "00100000" (binary) or a difference of one bit, indicating a correctable single bit error. Other patterns (including possible parity patterns if parity generation by the CPU is not disabled) exhibiting the same comparative properties will be evident to those skilled in the art. However, evaluation against an expected ECC may be more complex.

Once the ECC test is executing from ROM or EEPROM, the processor 110 is made to disable the ECC function (e.g. by adding an instruction to the test which changes the logical state of a control bit in the memory controller 140 such as clearing bit 17 of the memory configuration control register 2 for the MPC106 Memory controller chip). The read-modify-write—parity (RMW PAR) function should also be disabled in a similar manner as is usually provided in known ECC tests to make certain that the memory controller does not generate parity bits. Since the ECC is disabled for each 8-bit byte of data, when a test pattern representing a single-bit or multi-bit error, as discussed above, is specified in a STFD write command, at least one byte of odd parity is written by the CPU 110 as the ECC part of the word instead of the eight-bit ECC pattern the memory controller would otherwise provide.

That is, for the pattern "FFFEFEFEFEFEFEFE" (hex) alluded to above, the ECC pattern would be, for example, "00100000" (binary) for the parity bits whereas, with the ECC feature of the memory controller and the parity generation function of the CPU disabled, the parity bits would be "00000000" (binary). Therefore, if the pattern "FFFEFEFEFEFEFEFE" (hex) is written, and later read with the ECC feature of the memory controller 140 enabled, a single bit error should be detected in the memory controller.

Similarly, an error should be detected in the memory controller when the process is repeated using a pattern representing a multi-bit error. For this purpose, when parity generation by the CPU 110 is either disabled or enabled, the pattern "0123456789ABCDEF" (hex) is preferred to represent a two bit error since the expected ECC is "00010001" (binary) as compared with the odd parity byte (e.g. without disabling of parity generation in the CPU) of "00000000" (binary), thus clearly indicating a two-bit error which is reported to the CPU. The same parity signal ("00000000") would be forced if parity generation in the CPU was disabled. Thus, while not necessary to the practice of the invention, enabling parity generation for the multi-bit test (for these preferred data patterns) is preferred since doing so also tests the parity generation of the CPU and the ability of the CPU to force a particular signal when parity generation is disabled.

In summary, (and particularly since errors involving more than two bits are extremely rare and may not be accommodated by the ECC provided in the memory controller) the invention can carry out a test for single-bit and two-bit errors in a very few operations and extremely high speed in a short time and without requiring additional hardware. That is, the invention can be implemented by supplying a very few instructions and data in the ECC test otherwise normally provided in ROM or EEPROM.

More specifically, as illustrated in FIG. 4, the process in accordance with the invention begins with the invocation of a reset process 210 such as reset on power-up. At some point in the reset process and after an arbitrary number of BITs (indicated by a dashed arrow) have been performed, an ECC test 220 will be invoked. After an arbitrary number of operations are performed (also indicated by a dashed arrow) in the ECC test, but preferably near the completion thereof, the ECC function of the memory controller 140 is disabled in a manner dictated by the design thereof which is not important to the practice of the invention, as illustrated at 230, and the RMW PAR function is checked for being disabled, as illustrated at 240, as is customarily done in the course of the reset or ECC test operation. A single-bit error (SBE) pattern is then written to memory by the processor 110, as indicated at 250.

Then, the ECC function of the memory controller 140 is enabled, as shown at 260 at the location in memory to which the SBE pattern was written is read, as shown at 270. Since the byte containing an error will be of a predictable parity inconsistent with the expected ECC of the memory controller, the error will be reported by the ECC function of the memory controller, corrected and the parity check for the proper correction performed in the processor. Thus it can be seen that the process in accordance with the invention simultaneously tests both the memory location and the ECC function of the memory controller and verifies that a correct data pattern will be returned from memory by the memory controller even if a single bit error occurs in memory. It is desirable, but not necessary to repeat the single bit error test by looping at 221 but using a different memory location as many times as may be allowed by the reset time specification of the SBC or to reach some threshold at which the memory may be considered to be adequately functional.

The process is then repeated from step 230 but using a pattern corresponding to a multi-bit error (MBE) by looping as illustrated at 222. As a practical matter, a loop, as illustrated at 221 or 222 may not be convenient or efficient if the pattern to be written can be included in the test instruction being executed or a branching operation consumes more time. The multi-bit error test can also be repeated, at will, for a plurality of memory locations to the limit of a required reset time which may be specified for the SBC.

It should be noted that the sequence of a single-bit error(s) followed by a two-bit error (or vice-versa since the actual sequence is not important to the realization of the meritorious effects of the invention) together with the function of ECC which is capable of correcting single bit errors in an eight-bit byte has the additional function of allowing resumption of processing. Therefore, if the ECC is capable of correcting the pattern written, usable functionality of the memory, data bus and processor is confirmed within a very few processor and memory cycles beyond the normal ECC test for all but extremely rare multi-bit errors, in which case, other corrective action can be taken.

In view of the foregoing, it is seen that the reset process in accordance with the invention allows avoidance of a time-consuming pattern test of memory while avoiding a requirement for additional logic in hardware to force a desired pattern into memory by leveraging the functions of the parity check provided by the processor and ECC provided by the memory controller. The invention thus provides a confirmation of sufficient functionality to recover any errors having a significant likelihood of occurrence which may derive from bad bits in memory or on the data bus in a minimal amount of additional execution time beyond otherwise required built-in tests.

While the invention has been described in terms of a single preferred embodiment, those skilled in the art will recognize that the invention can be practiced with modification within the spirit and scope of the appended claims.

What is claimed is:

1. A method for resetting a single board computer, said method comprising the steps of
   initiating a reset operation to disable other activities on a data bus of said single board computer,
   writing a pattern of predictable parity to a location in memory while an error correcting code (ECC) function of a memory controller is disabled, the parity of the pattern being inconsistent with an expected ECC for the pattern in accordance with the ECC logic of the memory controller, wherein the step of writing injects errors into the location in memory, and
   reading a pattern from said location in memory with said error correcting code feature enabled.

2. A method as recited in claim 1 wherein said pattern represents a single-bit error, including the further steps of
   repeating said writing and reading steps using a pattern of predictable parity representing a multi-bit error.

3. A method as recited in claim 2, wherein said pattern representing a multi-bit error represents a two-bit error.

4. A method as recited in claim 1, wherein said pattern of predictable parity representing a single bit error is FFFEFEFEFEFEFEFE.

5. A method as recited in claim 3, wherein said pattern of predictable parity representing a two-bit error is 1234567890ABCDEF.

6. A method as recited in claim 5, wherein said pattern of predictable parity representing a single bit error is FFFEFEFEFEFEFEFE.

7. A method as recited in claim 1, including the further steps of
   writing a pattern of predictable parity to another location in memory while an error correcting code function of a memory controller is disabled, and
   reading a pattern from said another location in memory with said error correcting code feature enabled.

8. A method as recited in claim 7 wherein said pattern represents a single-bit error, including the further steps of
   repeating said writing an reading steps using a pattern of predictable parity representing a multi-bit error.

9. A method as recited in claim 1, including the further step of
   determining a number of bits of a parity byte which differ from an error correcting code for said pattern of predictable parity.

10. A method as recited in claim 2, including the further steps of
    disabling a parity generation function of a processor in said single board computer when said pattern of predictable parity represents a single bit error, and
    enabling a parity generation function of said processor in said single board computer when said pattern of predictable parity represents a multi-bit error.

11. A method as recited in claim 1, wherein the single board computer reset in the initiating step supports parity generation and checking on a data bus and is connected to a memory controller which supports error correction codes but does not require hardware support for forcing errors into memory for testing ECC logic.

12. A method of testing memory of a data processor comprising the steps, in sequence, of
    a. invoking a test of an error correcting code (ECC) function of a memory controller of said data processor,
    b. disabling said error correction code function of said memory controller,
    c. writing a pattern of bits of predictable parity to memory of said data processor, the parity of the pattern being inconsistent with an expected ECC for the pattern in accordance with the ECC logic of the memory controller, wherein the step of writing injects errors into the memory, d. enabling said error correction code function of said memory controller, e. reading said pattern of bits from said memory, and f. comparing parity bits of said pattern of bits with an error correcting code corresponding to said pattern of bits.

13. A method as recited in claim 12, including the further steps of disabling parity generation in said data processor, performing steps a.–f. at least once, enabling parity generation in said data processor, and performing steps a.–f. at least once.

14. A method as recite in claim 12, wherein the data processor supports parity generation and checking on a data bus and supports error correction codes but does not require hardware support for forcing errors into memory for testing ECC logic.

* * * * *